(12) United States Patent
Roberts

(10) Patent No.: US 11,065,828 B2
(45) Date of Patent: Jul. 20, 2021

(54) METHOD AND SYSTEM FOR FABRICATING A COMPOSITE STRUCTURE

(71) Applicant: The Boeing Company, Chicago, IL (US)

(72) Inventor: Richard William Roberts, Port Melbourne (AU)

(73) Assignee: The Boeing Company, Chicago, IL (US)

( * ) Notice: Subject to any disclaimer, the term of this patent is extended or adjusted under 35 U.S.C. 154(b) by 221 days.

(21) Appl. No.: 15/592,129

(22) Filed: May 10, 2017

(65) Prior Publication Data

US 2017/0341317 A1 Nov. 30, 2017

(30) Foreign Application Priority Data

May 27, 2016 (AU) .............................. 2016203504

(51) Int. Cl.
*B29C 70/44* (2006.01)
*B29C 70/54* (2006.01)
*F25B 21/02* (2006.01)

(52) U.S. Cl.
CPC ............ *B29C 70/44* (2013.01); *B29C 70/443* (2013.01); *B29C 70/54* (2013.01); *F25B 21/02* (2013.01)

(58) Field of Classification Search
CPC ............................. B29C 70/44; B29C 70/443
See application file for complete search history.

(56) References Cited

U.S. PATENT DOCUMENTS 3,840,626 A * 10/1974 Laskawy et al. ....... B29C 33/52
264/317
5,240,542 A 8/1993 Miller et al.
7,413,694 B2 * 8/2008 Waldrop, III ......... B29C 70/443
264/102
2014/0318693 A1 * 10/2014 Nelson ................ B29C 35/0266
156/196
2015/0343669 A1 12/2015 Jensen et al.
2017/0352794 A1 * 12/2017 Takagi .................... B32B 25/20

FOREIGN PATENT DOCUMENTS

JP       2004 130723      4/2004
WO    WO 02/062566 A2   8/2002

OTHER PUBLICATIONS

"Thermal Analysis of Thermoplastics", Mar. 2006, p. 1, Mettler-Toledo GmbH Analytical, Switzerland. <URL: http://us.mt.com/dam/LabDiv/Campaigns/MPE2013/performance_plastics/download/thermal_analysis_of_thermoplastics.pdf>.
Search Report and Written Opinion issued by the Intellectual Property Office of Singapore for Patent Application No. 10201704211T, dated Feb. 6, 2020, 9 pages.

* cited by examiner

*Primary Examiner* — Nahida Sultana
*Assistant Examiner* — Asha A Thomas
(74) *Attorney, Agent, or Firm* — Haynes and Boone, LLP

(57) ABSTRACT

A method and system for fabricating a composite structure is disclosed. A composite preform (10) has an upper surface (14) and an opposing lower surface (15). The upper and lower surfaces (14, 15) each define a preform major surface. A heat sink (120) is located in proximity to one of the preform major surfaces so as to extend across only a portion (16) of the composite preform (10). A resin is cured in the composite preform (10) to form the composite structure. The resin cures exothermically. During curing of the resin, heat is conducted away from the portion (16) of the composite preform (10) into the heat sink (120).

20 Claims, 8 Drawing Sheets

METHOD AND SYSTEM FOR FABRICATING A COMPOSITE STRUCTURE

CROSS-REFERENCE TO RELATED APPLICATIONS

This patent application claims the benefit of Australian Patent Application No. 2016203504 filed May 27, 2016 which is hereby incorporated by reference in its entirety.

FIELD

The present disclosure generally relates to the fabrication of composite structures and in particular relates to a method and system for fabricating a composite structure.

BACKGROUND

Composite structures are typically fabricated by curing a resin in a composite preform formed of multiple plies of reinforcing fibres. In one form, the plies are pre-impregnated with resin, each forming what is referred to as a prepreg ply, with the prepreg plies being stacked in a laminate form to form the composite preform. In another form, a stack of dry plies formed of woven or braided fibres and/or chopped strand mat are infused with resin under vacuum pressure prior to curing the resin.

To cure the resin, the resin impregnated composite preform is typically located within an oven or autoclave that is gradually heated to a suitable temperature for cure of the resin, and held at that temperature for a set period of time to ensure full curing of the resin. The resin curing process for thermosetting resins used in the fabrication of composite structures is an exothermic reaction. Heat energy is released during the curing process in order to form crosslinks. The energy released to form the crosslinks is generally absorbed by the surrounding environment. However, depending on the manner in which the resin is heated, the resin may release energy at a faster rate than the surrounding environment can absorb it. This may result in exothermic overheating of the composite preform, with the temperature of the composite preform exceeding the set cure temperature of the oven during the resin curing process.

FIG. 1 depicts a typical temperature profile during the initial heating to cure temperature phase of the resin curing process, where the oven temperature is ramped up to the set cure temperature (about 182° C. in the example shown) and then held at the cure temperature. The temperature of the composite preform, measured at a set location on the upper surface of the composite preform with a thermocouple, initially lags the air temperature of the oven, but gradually increases toward and then exceeds the oven temperature, as a result of the increased heat energy generated through the exothermic cure of the resin. In the example shown, the local temperature of the upper surface of the composite preform reaches a peak of about 195° C.

As a result of the potential for this exothermic overheating of the composite preform, the rate of increase of temperature of the oven, and maximum set cure temperature of the oven, needs to be controlled to avoid the curing composite structure from reaching excessive temperatures which may adversely impact the mechanical properties of the cured composite structure. In particular, localised portions of the composite preform may be subjected to excessive exothermic overheating. This may particularly be the case in thicker regions of the composite preform, such as where additional plies are utilised to form what is referred to as "padups".

Padups are typically utilized in areas of a composite structure subject to increased local stresses, such as at metal fitting attachment points. Padups generally have a higher volume of resin per unit of preform surface area, given the increased thickness of preform and thus resin. Such thicker portions may thus be more susceptible to excessive exothermic heat build-up during exothermic curing of the resin, due to the increased volume of resin. Localised hotspots may also develop as a result of temperature inconsistencies within the oven.

This problem is typically managed by reducing the oven heating rate during the transition to cure of the resin, to ensure more gradual application of thermal energy during the time at which the resin is most likely to release excessive energy. This may, however, result in the cure profile being so slow that the composite structure is at risk of falling below minimum heating rate requirements for appropriate cure of the resin. A decrease in the heating rate also increases the total time required for cure of the composite structure, thereby reducing production rates.

The present disclosure is made bearing the above problem in mind.

SUMMARY

The present disclosure is generally directed to a method and system for fabricating a composite structure. According to embodiments of the present disclosure, a heat sink is utilised to conduct heat away from a portion of a composite preform during cure. Such a heat sink may thus be located in proximity to a portion of a composite preform that may otherwise be subject to excessive exothermic heating of resin during the curing cycle. In certain embodiments, the heat sink may be a passive heat sink formed of an endothermic material, such as a thermoplastic patch, which melts to absorb energy, whilst in other embodiments the heat sink may be an active heat sink, such as a thermoelectric cooling device.

According to one aspect, the present disclosure provides a method of fabricating a composite structure. A composite preform having an upper surface and an opposing lower surface is provided. The upper and lower surfaces each define a preform major surface. A heat sink is located in proximity to one of the preform major surfaces so as to extend across only a portion of the composite preform. The heat sink thus does not extend across the entire preform major surface. A resin is cured in the composite preform to form the composite structure. The resin cures exothermically. During curing of the resin, heat is conducted away from the portion of the composite preform into the heat sink.

In certain embodiments, the heat sink is a passive heat sink formed of an endothermic material. The passive heat sink may comprise a thermoplastic patch. The patch melts during curing of the resin, absorbing heat during melting of the patch.

In alternative embodiments, the heat sink is an active heat sink. The active heat sink may comprise a thermoelectric cooling device. The thermoelectric cooling device is operated during curing of the resin to conduct heat away from the portion of the composite preform.

In typical embodiments, the method further comprises locating the lower surface of the composite preform on an upper tool surface of a tool. A first vacuum bagging film is placed over the composite preform and sealed relative to the tool surface to define a sealed first cavity between the first vacuum bagging film and the tool surface. The composite preform is located in the first cavity. At least partial vacuum pressure is applied to the first cavity during curing of the resin. The heat sink is located above the first vacuum bagging film in proximity to the upper surface of the composite preform.

In certain embodiments, the method further comprises placing a second vacuum bagging film over the first vacuum bagging film and heat sink and sealing the second vacuum bagging film relative to the tool surface to define a second cavity between the first and second vacuum bagging films. At least partial vacuum pressure is applied to the second cavity during curing of the resin. The heat sink is located in the second cavity.

The composite preform may have a non-uniform thickness measured between the upper and lower surfaces, in which case the portion of the composite preform may have a thickness greater than an average thickness of the composite preform.

In certain embodiments, the method may further comprise infusing the resin into the composite preform prior to curing of the resin.

In alternative embodiments, the composite preform may comprise a plurality of plies of prepreg composite material. In such a configuration, the resin is pre-impregnated in the prepreg composite material.

According to a second aspect, the present disclosure provides a system for fabricating a composite structure. The system includes a composite preform having an upper surface and an opposing lower surface. The upper and lower surfaces each define a preform major surface. The system further includes an exothermically curing resin, either to be infused into the composite preform, or pre-impregnated in the composite preform (when in the form of a prepreg composite material). A heat sink is located in proximity to one of the preform major surfaces so as to extend across only a portion of the composite preform. The heat sink thus does not extend across the entire preform major surface. A heat source is provided for heating the composite preform to cure the resin.

In certain embodiments, the heat sink is a passive heat sink formed of an endothermic material. The passive heat sink may comprise a thermoplastic patch. The thermoplastic patch has a melting temperature less than an exotherm peak temperature of the resin.

In alternative embodiments, the heat sink is an active heat sink. The heat sink may comprise a thermoelectric cooling device.

In typical embodiments, the system further comprises a tool having an upper tool surface. The lower surface of the composite preform is located on the tool surface. A first vacuum bagging film extends over the composite preform and is sealed relative to the tool surface to define a first cavity between the first vacuum bagging film and the tool surface. The composite preform is located in the first cavity. A vacuum source communicates with the first cavity. The heat sink is located above the first vacuum bagging film in proximity to the upper surface of the composite preform.

In certain embodiments, the system further comprises a second vacuum bagging film extending over the first vacuum bagging film and the heat sink. The second vacuum bagging film is sealed relative to the tool surface to define a second cavity between the first and second vacuum bagging films. The vacuum source communicates with the second cavity and the heat sink is located in the second cavity.

In certain embodiments, the composite preform has a non-uniform thickness measured between the upper and lower surfaces. The portion of the composite preform may have a thickness greater than an average thickness of the composite preform.

In certain embodiments, the resin is to be infused into the composite preform.

In alternative embodiments, the composite preform comprises a plurality of plies of prepreg composite material containing the resin.

The features described above may be implemented independently in various embodiments of the present disclosure or may be combined in the other embodiments as will be appreciated by a person skilled in the art.

DRAWINGS

Preferred embodiments of the present disclosure will now be described, by way of examples only, with reference to the accompanying drawings wherein.

DETAILED DESCRIPTION

Figure 1:
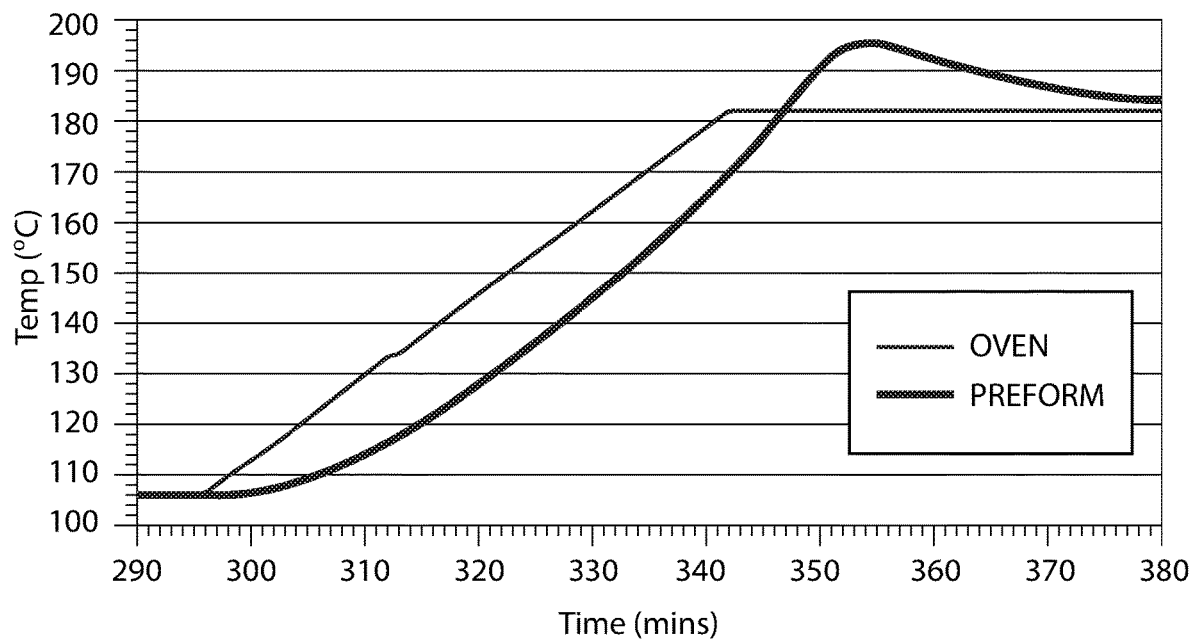
FIG. 1 is a graph depicting a cure temperature profile for a typical prior art composite curing process.

Methods and systems according to exemplary embodiments of the present disclosure will now be described in detail. In general, methods of fabricating a composite structure according to the present disclosure include providing a composite preform having opposing upper and lower surfaces that each define a preform major surface. A heat sink is located in proximity to one of the preform major surfaces (that is, the upper or lower surface) so as to extend across only a portion of the preform major surface. Thus the heat sink thus does not extend over the entire preform major surface. The heat sink may be a passive heat sink formed of an endothermic material, such as a thermoplastic patch that melts during the resin curing process, or an active heat sink, such as a thermoelectric cooling device. Resin in the composite preform is cured to form the composite structure, with the resin curing exothermically. During curing of the resin, heat is conducted away from the localized region of the preform major surface into the heat sink. The heat sink may thus be applied to specific portions of the composite preform that would otherwise be subject to excessive exothermic heating during curing. The method may be applied to composite structure fabrication processes involving resin infusion of a dry preform, or alternatively may be applied to composite structure fabrication processes involving prepreg composite materials.

Now referring to FIGS. 2 and 3 of the accompanying drawings, a system 100 for fabricating a composite structure according to a first embodiment will now be described. The system 100 has a composite preform 10 having an upper surface 14 and an opposing lower surface 15. The upper and lower surfaces 14, 15 each define a preform major surface. In the first embodiment, the composite preform 10 is a dry preform to be infused with an exothermically curing resin provided in a resin supply 141. A heat sink, which in the first embodiment is a passive heat sink formed of an endothermic material, is located in proximity to one of the preform major surfaces, and particularly the upper surface 14 in the first embodiment. Endothermic materials are materials that absorb energy, typically by a phase change or chemical reaction, when exposed to heat. In the first embodiment, the passive heat sink is in the form of a thermoplastic patch 120. The thermoplastic patch 120 extends across only a portion 16 of the upper surface 14. The thermoplastic patch 120 thus extends only over a region of the upper surface 14 having a smaller area than the total area of the upper surface 14 and does not extend across the entire upper surface 14. The system further comprises a heat source, which may be in the form of an oven 170 (or autoclave), for heating the composite preform 10 to cure the resin, following resin infusion. The oven 170 may also be utilized to heat the composite preform 10 and resin supply 141 for resin infusion, as will be discussed below.

Figure 2:
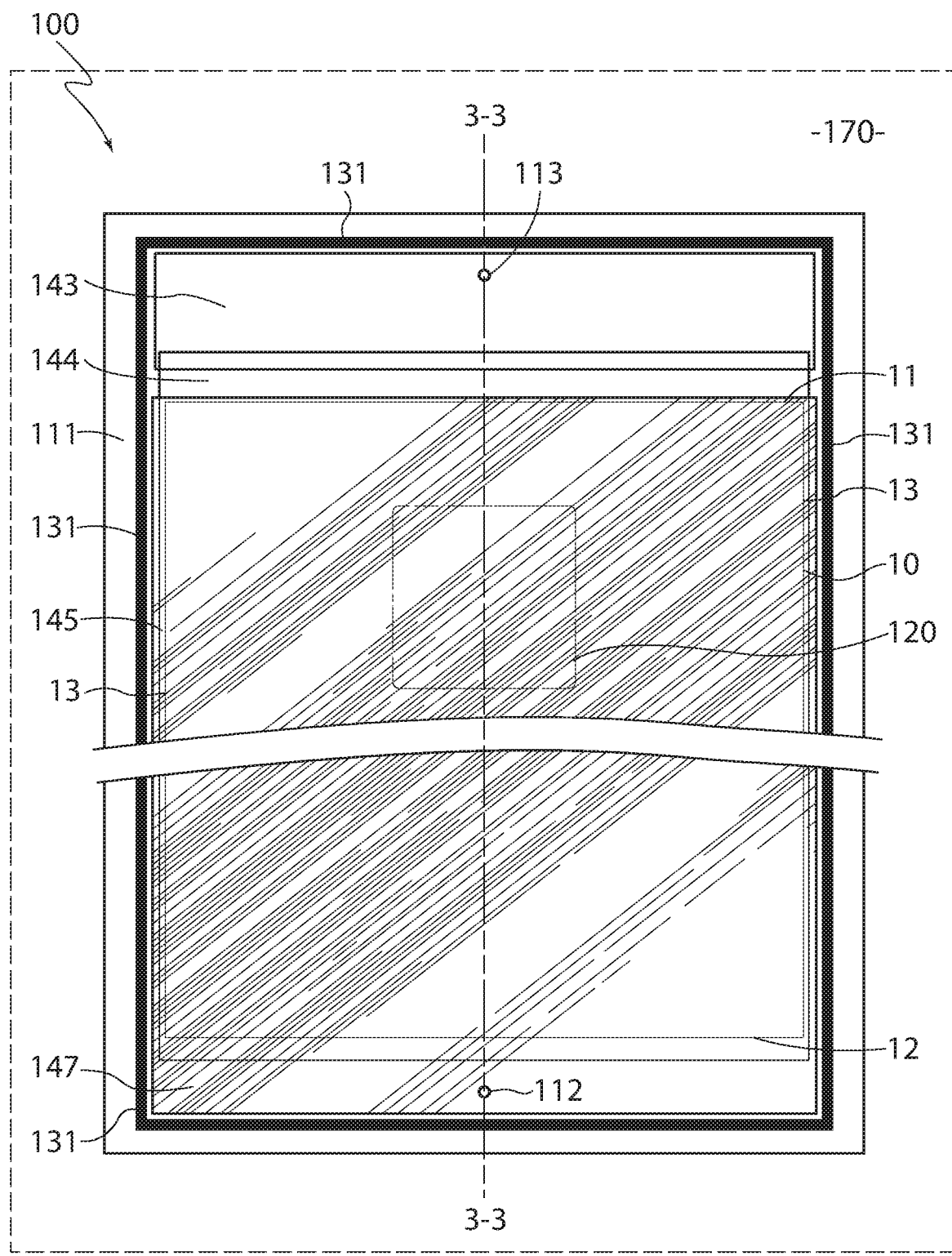
FIG. 2 is a schematic plan view of a system for fabricating a composite structure according to a first embodiment.
Figure 3:
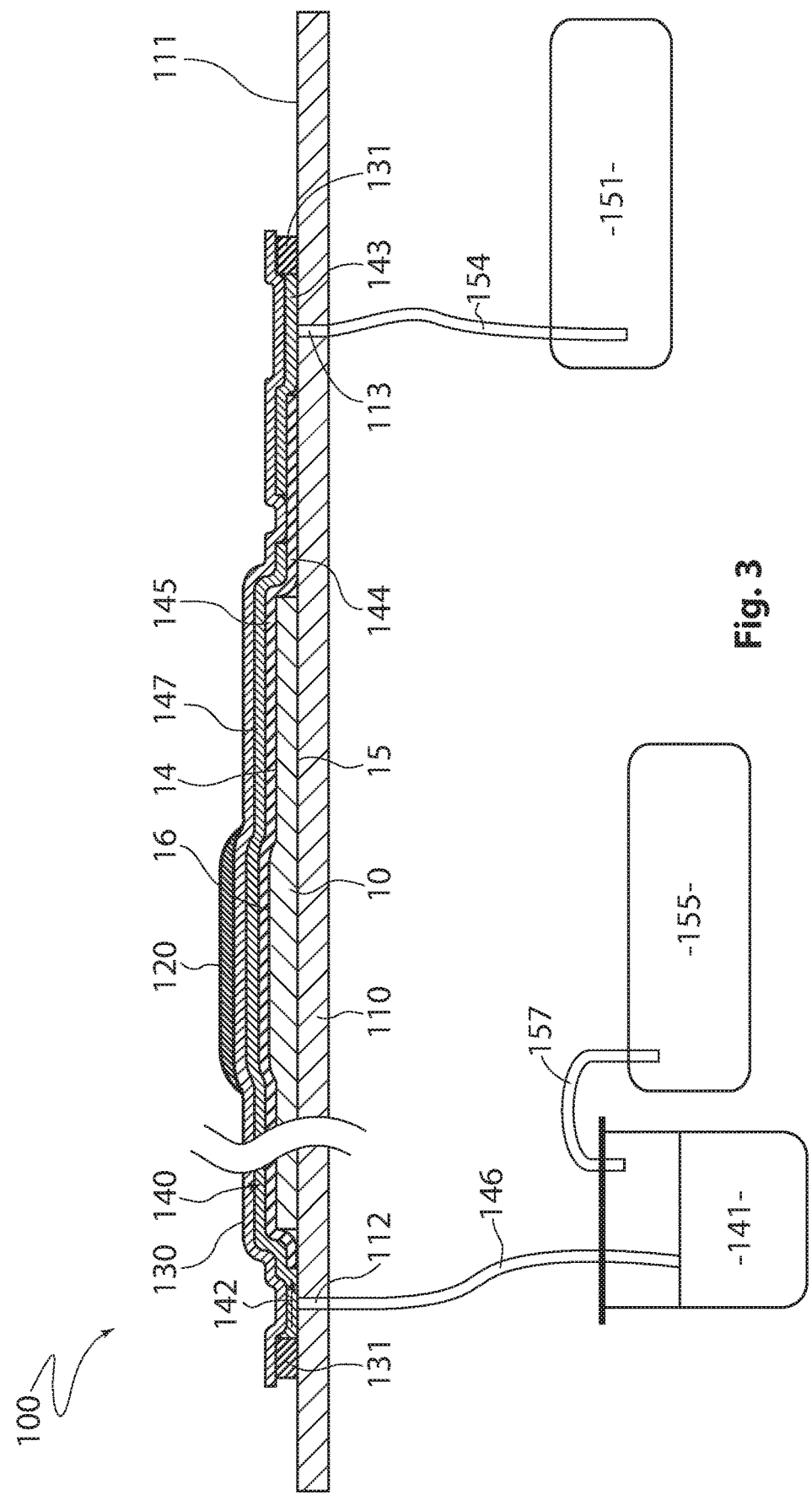
FIG. 3 is a schematic cross-sectional view of the system of FIG. 2 taken at cross-section 3-3.

In the configuration of the first embodiment depicted in FIGS. 2 and 3, the system is of a single vacuum bag composite layup configuration. In this configuration, the system 100 has a tool 110 having an upper tool surface 111, with the lower surface 15 of the composite preform 10 being located on the tool surface 111. A vacuum bagging film 130 extends over the composite preform 10 and is sealed relative to the tool surface 111 to define a sealed first cavity 140 between the vacuum bagging film 130 and the tool surface 111. The composite preform 10 is located in the first cavity 140. In the first embodiment, the thermoplastic patch 120 is located in proximity to the upper surface 14 of the composite preform 10, particularly being located directly on top of the vacuum bagging film 130.

The tool 110 may be formed of any of various structural materials, including mild steel, stainless steel, invar or a carbon composite material that will maintain its form at elevated temperatures associated with curing, so as to provide a geometrically stable tool surface 111 though the resin curing process. The tool surface 111 may be substantially flat for the production of composite structures having a substantially flat lower surface, such as wing or fuselage skin panels, or otherwise shaped as desired so as to provide a shaped surface of a non-planar composite structure.

The composite preform 10 may take any form suitable for resin infusion and as dictated by the geometric and structural requirements of the laminated composite structure to be fabricated. The composite preform 10 may comprise a layup of multiple plies of reinforcing material, each formed of woven or braided fibers and/or chopped strand mat. The preform plies may be formed of any of various reinforcing fibers, such as carbon, graphite, glass, aromatic polyamide or any other suitable material for fabricating a resin reinforced laminated composite structure. The plies may form a dry preform, without any resin, or alternatively the preform may have some pre-existing resin content prior to the resin infusion process. The composite preform 10 is located on the tool surface 111 with the lower surface 15 of the preform 10 oriented on the tool surface 111 such that the lower surface of the resulting cured composite structure will match the form of the tool surface 111. The composite preform 10 located on the tool surface 111 has a laterally extending downstream edge 11, an opposing laterally extending upstream edge 12 and opposing longitudinally extending side edges 13. In the context of the present specification, upstream and downstream sides of the composite preform 10 are identified with reference to the direction of flow of resin, as will be further described. The preform 10 may take any desired shape corresponding to the shape of the laminated composite structure to be formed.

The composite preform may have a uniform thickness or, alternatively as depicted in the embodiment of FIGS. 2 and 3, the composite preform 10 may have a non-uniform thickness as measured between the upper and lower surfaces 14, 15. Particularly, in the arrangement depicted, the portion 16 of the composite preform 10 has a thickness greater than an average thickness of the composite preform 10. In the first embodiment, the thicker portion 16 of the composite preform 10 is in the form of a padup, having an increased thickness as a result of being provided with additional plies of reinforcing material to provide local structural reinforcement. Padups, and other portions of composite preforms having a locally increased thickness, generally have a higher volume of resin per unit of preform surface area once resin infused, given the increased thickness of preform and thus resin. Such thicker portions may thus be more susceptible to excessive exothermic heat build-up during exothermic curing of the resin, due to the increased volume of resin. Other portions of the composite preform 10 that do not have an increased thickness may also be subject to exothermic heat build up, such as resulting from uneven temperatures within the oven 170, and thus suitable for application of the thermoplastic patch 120.

The resin supply 141 communicates with the first cavity 140 through one or more resin infusion inlets 112 extending through the tool 110 on the upstream side of the composite preform 10, via one or more resin supply pipes 146. The resin supply pipes 146 are typically formed of copper. A first vacuum source 151 communicates with the first cavity 140 through one or more vacuum outlets 113 extending through the tool 110 on a downstream side of the composite preform 10, via one or more vacuum outlet pipes 154, which are also typically formed of copper. Rather than communicating the resin supply 141 and first vacuum source 151 with the first cavity 140 via the resin infusion inlet 112 and vacuum outlet 113 extending through the tool 110, it is also envisaged that the resin supply 141 and first vacuum source 151 may communicate with the first cavity 151 through the vacuum bagging film 130. In such a configuration, apertures may be formed in the vacuum bagging film 130 and communicated with the resin supply 141 and first vacuum source 151, sealing around the apertures. In the embodiment depicted, the resin supply 141 also communicates with a second vacuum source 155 via a second vacuum pipe 157.

A flow path 142 extends from the resin supply 141, through the first cavity 140, the composite preform 10 and to the first vacuum source 151. An upstream portion of the flow path 142 comprises the resin supply pipe(s) 146 and resin infusion inlet 112 extending through the tool 110. A mid portion of the flow path 142, defined by the first cavity 140, is formed by the composite preform 10 and various layers of layup materials located beneath the vacuum bagging film 130. The layup materials include a permeable peel ply 145 located directly on, and extending over, the entirety of the composite preform 10, beyond each of the edges 11, 12, 13 of the composite preform 10, with a downstream portion 144 of the peel ply 145 extending downstream of the downstream edge 11 of the composite preform 10. A layer 147 of permeable flow media is placed over the peel ply 145 and extends beyond the upstream edge of the peel ply 145 to beyond the resin infusion inlet(s) 112. The layer 147 of permeable flow media extends to beyond the downstream edge 11 of the composite preform 10 but does not cover the entirety of the downstream portion 144 of the peel ply 145. The peel ply 145 serves to prevent the layer 147 of permeable flow media from sticking to the composite preform 10 and also provides a path for infusion of resin into the composite preform 10, both along the upstream edge 12 of the composite preform 10 and through the upper surface 14 of the composite preform 10. The peel ply 145 also allows volatiles given off during curing of the resin to be drawn away from the composite preform 10. The peel ply 145 also constitutes a permeable flow media, and may suitably be in the form of a PTFE coated fiberglass fabric, such as Release Ease® 234, available from AirTech International Inc, or any other permeable peel ply material. The layer 147 of permeable flow media provides a passage for the resin through the first cavity 140 along the top of the composite preform 10, along with a path for the escape of volatiles from the first cavity 140. The layer 147 of permeable flow media may suitably be in the form of a nylon mesh material, such as Plastinet® 15231 also available from AirTech International Inc, or any other highly permeable media enabling passage of resin therethrough.

A downstream portion of the flow path 142 comprises a further strip 143 of permeable flow media, the vacuum outlet(s) 113 and vacuum pipe(s) 154. The strip 143 of permeable flow media extends across the downstream edge of the downstream portion 144 of the peel ply 145 and extends further downstream across the vacuum outlet(s) 113. The strip 143 of permeable flow media is typically formed of the same material as the layer 143 of permeable flow media. A gap is located between the layer 147 and strip 143 of permeable flow media.

The vacuum bagging film 130 extends over the entire layup formed by the composite preform 10, peel ply 145 and layer 147 and strip 143 of permeable flow media. Any of various vacuum bagging film materials may be utilized, including but not limited to Airtech WL7400 or SL800 vacuum bagging films available from Airtech International Inc. The vacuum bagging film 130 is sealed relative to the tool surface 111 about the periphery of the vacuum bagging film 130 by way of strips 131 of sealing tape, which may conveniently be in the form of a mastic sealant tape, such as GS-213-3 sealant tape available from AirTech International Inc.

As may be best appreciated from FIG. 3, the vacuum bagging film 130 defines the upper boundary of the resin flow path 142. In the gap located between the layer 147 and strip 143 of permeable flow media, the vacuum bagging film 130 restricts the thickness of the flow path 142 between the tool upper surface 111 and vacuum bagging film 130 to the downstream portion 144 of the peel ply 145, which is typically of a reduced permeability as compared to the layer 147 of permeable flow media. All downstream flow of resin is thus restricted through the downstream portion 144 of the peel ply 145, which defines a permeable resin flow control choke.

The thermoplastic patch 120 is configured to melt when the thicker portion 16 of the composite preform 10 is subject to excessive exothermic heat build-up during exothermic cure of the resin 141. In particular, the thermoplastic patch 120 may be selected such that it has a melting temperature exceeding the temperature at which the resin 141 is infused (which may be at an elevated temperature, typically of the order of 100 to 1100 C), and equal to or less than the peak exotherm temperature of the resin 141 that would otherwise be experienced during cure without the thermoplastic patch 120 (as may be determined by a trial cure cycle without the thermoplastic patch 120). Different epoxy resins may release heat energy as a result of crosslinking during the cure process at different temperatures, depending on the resin selected. For example, one epoxy resin commonly used in resin infusion applications, HexFlow® RTM6, available from Hexcel Corporation, can begin releasing energy from about 1400 C during heating to cure temperature. For certain cure profiles, with a typical cure temperature of 1800 C, HexFlow® RTM6 may have a peak exotherm temperature of about 190 to 2000 C. Selecting a thermoplastic material for the thermoplastic patch 120 with a melting temperature less than the peak exotherm temperature, and particularly lying in the range at which the resin releases energy faster than it can be absorbed by the surrounding environment (about 1500 C to 1800 C for the example depicted in FIG. 1) may be appropriate for use with typical epoxy resins.

Figure 4:
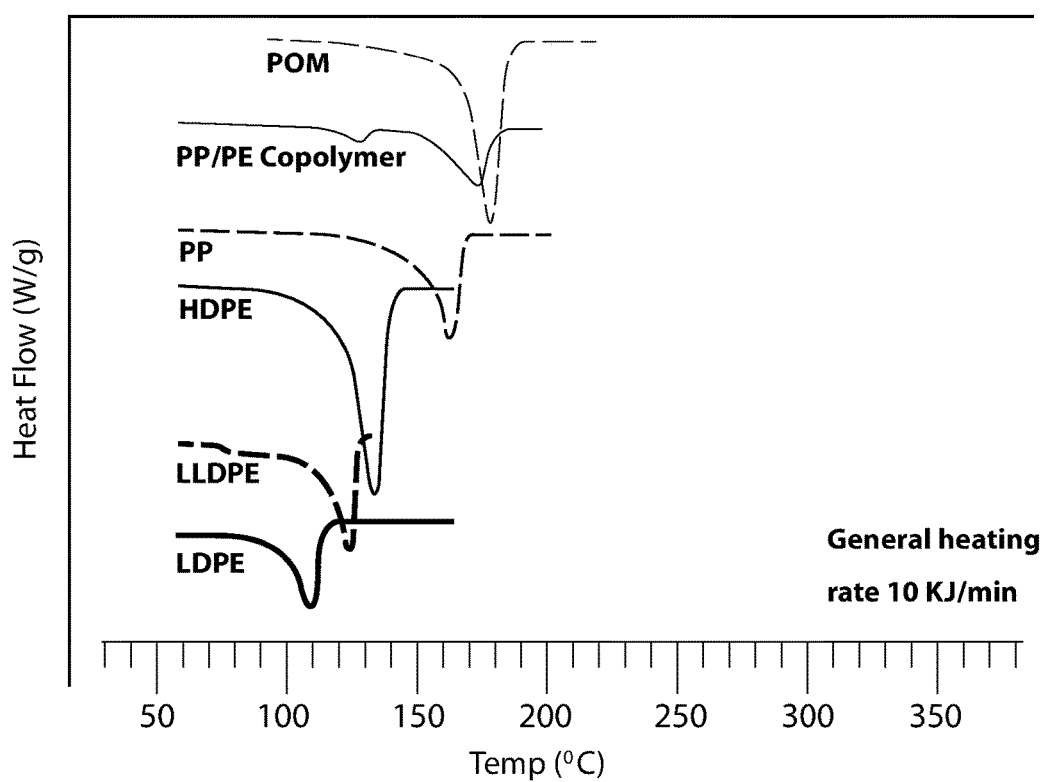
FIG. 4 is a graph depicting the melting profile of various thermoplastic materials.

FIG. 4 provides a graph depicting the melting profile of various thermoplastic materials, as sourced from the online publication Thermal Analysis of Thermoplastics, provided by Mettler Toledo. The graph of FIG. 4 depicts the heat flux of each thermoplastic material plotted against temperature through the melting process, with the trough in each graph representing the endothermic melting process. When these thermoplastic materials are heated to a temperature corresponding to the endothermic trough and melting, the melting phase change comprises an endothermic reaction, allowing the thermoplastic patch 120 to act as a heat sink by absorbing heat. When the exothermic curing of the resin results in excessive heat energy being released by resin within the portion 16 of the composite preform 10, heat transfers from the upper surface 14 of the composite preform 10 at the portion 16 to the lower surface of the thermoplastic patch 120, due to its proximity. The thermoplastic patch 120 should thus be located in sufficient proximity to the upper surface 14 (or lower surface 15) of the composite preform 10 to allow this heat transfer. When the thermoplastic patch 120 is heated to a temperature corresponding to the endothermic trough around the melting temperature of the thermoplastic material, the thermoplastic patch 120 absorbs heat energy as it melts, thereby conducting heat away from the portion 16 of the composite preform 10. For an epoxy resin having an exotherm peak temperature of around 190 to 2000 C, and a rate of heat energy release exceeding the rate of energy absorption by the environment over the range of around 150 to 1800 C, polyoxymethylene (POM), which has an endothermic trough and melting temperature at about 170 to 1800 C may be suitable for the thermoplastic patch 120]. Other thermoplastic materials with endothermic troughs and melting at lower temperatures may also be suitable, including high density polyoxyethylene (HPPE) which has an endothermic trough and melting temperature within the range of about 1300 C to 1400 C, or polypropylene (PP) which has an endothermic trough and melting temperature within the range of about 1600 C to 1700 C. Other thermoplastic materials (or combinations of multiple thermoplastics) may alternatively be selected to suit particular applications and resin. Apart from epoxy resins, other suitable thermoset resins used for resin infusion that also exhibit a positive heat of reaction during curing (and therefore possible exothermic behavior) may include bismaleimide, benzoxazine, polyimide, cyanate esters and polyamide-imide resins.

The thermoplastic patch 120 may be formed with any size or shape to suit the specific application, and will generally be sized and shaped to generally correspond to the upper surface of the portion 16 of the composite preform 10 that is susceptible to experiencing excessive exothermic heating as a result of local exothermic behavior of the resin during cure. For any given portion 16, a single thermoplastic patch 120 may be applied or, alternatively, multiple smaller thermoplastic patches 120 may be applied. It is also envisaged that thermoplastic patches 120 may be applied to multiple portions across the upper surface 14 of the composite preform 10 as appropriate where multiple portions may be susceptible to excessive exothermic heating. The size and location of portions 16 for application of one or more thermoplastic patches 120 may be determined through simple assessment and identification of regions of the composite preform 10 that have a higher resin content due to locally increased thickness, or through trial and error in processing sample composite preforms without the use of any heat sink, identifying, by way of thermocouple, areas of local overheating. Alternatively, computational modelling may be utilized to identify regions that will likely be susceptible to excessive exothermic heating.

In use, once the system 100 has been assembled as discussed above, the resin supply 141 is heated to bring the resin to a suitable resin infusion temperature. Typically the entire system is heated within the oven 170 that is also used for subsequent curing. The temperature for resin infusion will be dependent upon the resin system utilized, and will typically be selected to provide a suitable viscosity enabling the resin to flow through the resin flow path 142. For epoxy resins, a suitable infusion temperature may be in the range of 100 to 1100 C.

At least partial vacuum pressure is applied to the downstream end of the first cavity 140, via the first vacuum source 151 and vacuum outlet(s) 113. A smaller partial vacuum (i.e., a higher absolute pressure) may also be applied to the resin supply 141, by way of a second vacuum source 155 connected to a second vacuum pipe 157, as shown in FIG. 3. Where partial vacuum is applied to the resin supply 141 by the second vacuum source 155, a pressure differential may be maintained between the first vacuum source 151 and second vacuum source 155 such that the absolute pressure at the vacuum outlet(s) 113 applied by the first vacuum source 151 is lower than the absolute pressure at the resin supply 141. In one example, a full vacuum (0 mbar/0 kPa absolute pressure) may be applied by the first vacuum source 151 and a higher pressure/lower vacuum of 500 to 800 mbar absolute pressure (50 to 80 kPa) may be applied to the second vacuum source 155, thereby providing a pressure differential of the same amount driving resin from the resin supply 141 through the resin flow path 142. Full vacuum pressure may also be applied to the resin supply 141 by the second vacuum source 155 prior to resin infusion to degas the resin.

Maintaining at least partial vacuum on the resin supply ensures at least a partial vacuum is maintained throughout the first cavity 140. Atmospheric pressure acting on the composite preform 10 through the vacuum bagging film 130, the layer 147 of permeable flow media and the peel ply 145 acts to consolidate the composite preform 10. Resin moves through the first cavity 140 along a wave front, through the layer 147 of permeable flow media, which will generally have a greater permeability than both the peel ply 145 and the composite preform 10, thus forming the path of least resistance. Resin passing through the layer 147 of permeable flow media will infuse down through the less permeable peel ply 145 and into the preform 10. Some resin will also flow laterally through the upstream edge 12 of the composite preform 10 and, to a lesser degree, through the opposing side edges 13 of the composite preform 10. Having the downstream edge 11 of the layer 147 of permeable flow media finish short of both the strip 123 of permeable flow media and the downstream portion 144 of the peel ply 145 prevents resin bypassing the preform 10 and simply being drawn through the layer 147 of permeable flow media directly into the vacuum outlet(s) 113. The rate of advance of the resin wave front is inhibited by forcing the resin to pass downstream longitudinally through a permeable resin flow control choke defined by the downstream portion 144 of the peel ply 145 once it passes the downstream edge 11 of the composite preform 10 and the downstream edge of the layer 147 of permeable flow media.

Once the composite preform 10 has been fully resin infused, the resin infused composite preform 10 may then be cured by gradually elevating the temperature of the oven 170 to a temperature suitable for curing of the resin. For typical epoxy resins, curing temperatures of the order of 1800 C to 2000 C will be typical. Full vacuum is typically maintained on the first vacuum source 151 during the curing process, to ensure the resin infused composite preform 10 remains consolidated and to assist in curing of the resin. If the curing resin within the portion 16 of the composite preform 10 starts to exhibit exothermic behavior and locally overheat the portion 16, also heating the thermoplastic patch 120 to a temperature exceeding its melting temperature, the thermoplastic patch 120 will melt, thereby conducting heat away from the portion 16 of the composite preform 10, with the heat being absorbed through the endothermic reaction of the melting process. As a result, the oven 170 may be heated to curing temperature more rapidly, and potentially to a higher curing temperature for quicker cure, than otherwise available without the use of the thermoplastic patch 120, with a decreased risk of overheating the portion 16 of the composite preform 10. More rapid process cycle times, whilst maintaining reliable cure, may thus be obtained.

Vacuum bagging films typically exhibit some air permeability, particularly at elevated temperatures associated with resin infusion and/or resin cure. Accordingly, one potential deficiency of the single vacuum bag configuration of the resin infusion system 100 of the first embodiment is that, with vacuum applied during the curing process, air may permeate through the vacuum bagging film 130 and into the composite preform 10, potentially resulting in porosity and resin starvation within the cured composite laminate. A double bag resin infusion system is thus envisaged in an effort to minimize or avoid such air permeation, by providing a second vacuum bagging film covering the first vacuum bagging film and applying vacuum pressure to the second vacuum bagging film during both the resin infusion and curing stages of operation.

Figure 5:
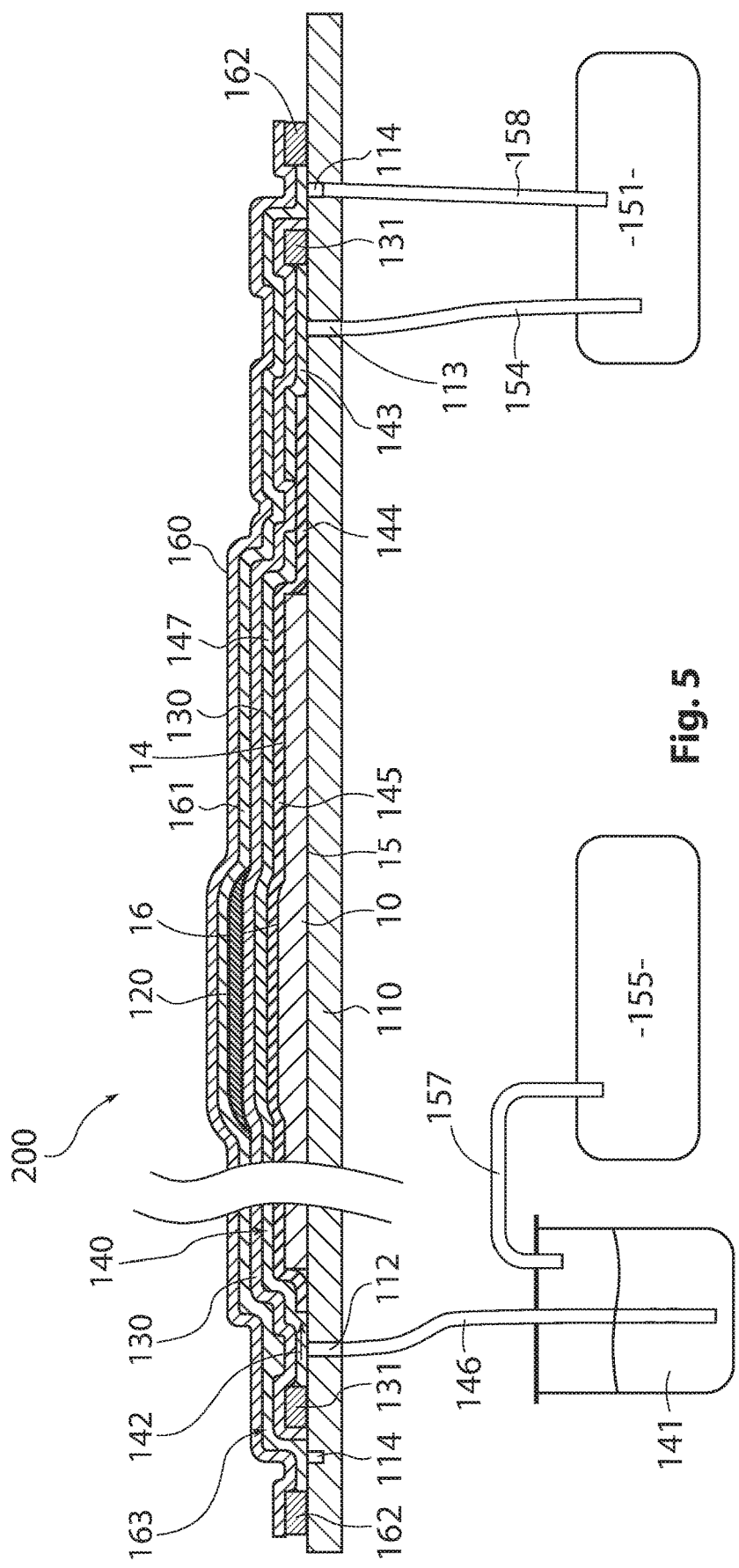
FIG. 5 is a schematic cross-sectional view of a system for fabricating a composite structure according to a second embodiment, taken at a cross-section equivalent to FIG. 3.

FIG. 5 depicts a schematic cross-sectional view (corresponding to FIG. 3) of such a double-bag configuration of the system 100 of the first embodiment, fabricating a system 200 according to a second embodiment. The system 200 of the second embodiment is substantially identical to the system 100 of the first embodiment, with the addition of a second vacuum bagging film 160 and associated breather layer 161. Accordingly, features of the system 200 of the second embodiment that are identical to features of the system 100 of the first embodiment are provided with identical reference numerals and will not be further discussed.

In the system 200 of the second embodiment as depicted in FIG. 5, the composite preform 10 and associated consumable layers, such as the layer 147 and strip 143 of permeable flow media, peel ply 145 and first vacuum bagging film 130, are first assembled in the same manner as described above in relation to the system 100 of the first embodiment. The thermoplastic patch 120 is also located on the first vacuum bagging film 130 in the manner described above in relation to the first embodiment. A breather layer 161, typically being a highly permeable fabric formed of fiberglass or the like is then located over, and fully covering, the first vacuum bagging film 130 and the thermoplastic patch 120. A suitable breather layer is a breather cloth formed of a high film non-woven polyester material, such as Airweave® N10, available from Airtech International Inc. The breather layer 161 extends over a vacuum groove 114 that extends around the perimeter of the tool surface 111 and is connected to the first vacuum source 151 (or a separate third vacuum source) by way of a third vacuum pipe 158. The second vacuum bagging film 160 is then located to cover the entire breather layer 161 and is sealed relative to the tool surface 111 by way of further strips 162 of sealing tape, forming a sealed second cavity 163 between the first and second vacuum bagging films 130, 160. The composite preform 10 is resin infused and subsequently cured using the same process as described above in relation to the system 100 of the first embodiment, with at least a partial vacuum being applied to the second cavity 163 between the first and second vacuum bagging films 130, 160 by the first vacuum source 151 (or separate third vacuum source) throughout resin infusion and curing. The second vacuum bagging film 160 and associated vacuum applied to the second cavity 163 protects against any minor leaks associated with the first vacuum bag 130, with the vacuum applied evacuating any air permeating through the second vacuum bagging film 160 toward the composite preform 10 through the breather layer 161, rather than allowing it to permeate through to the composite preform 10.

Figure 6:
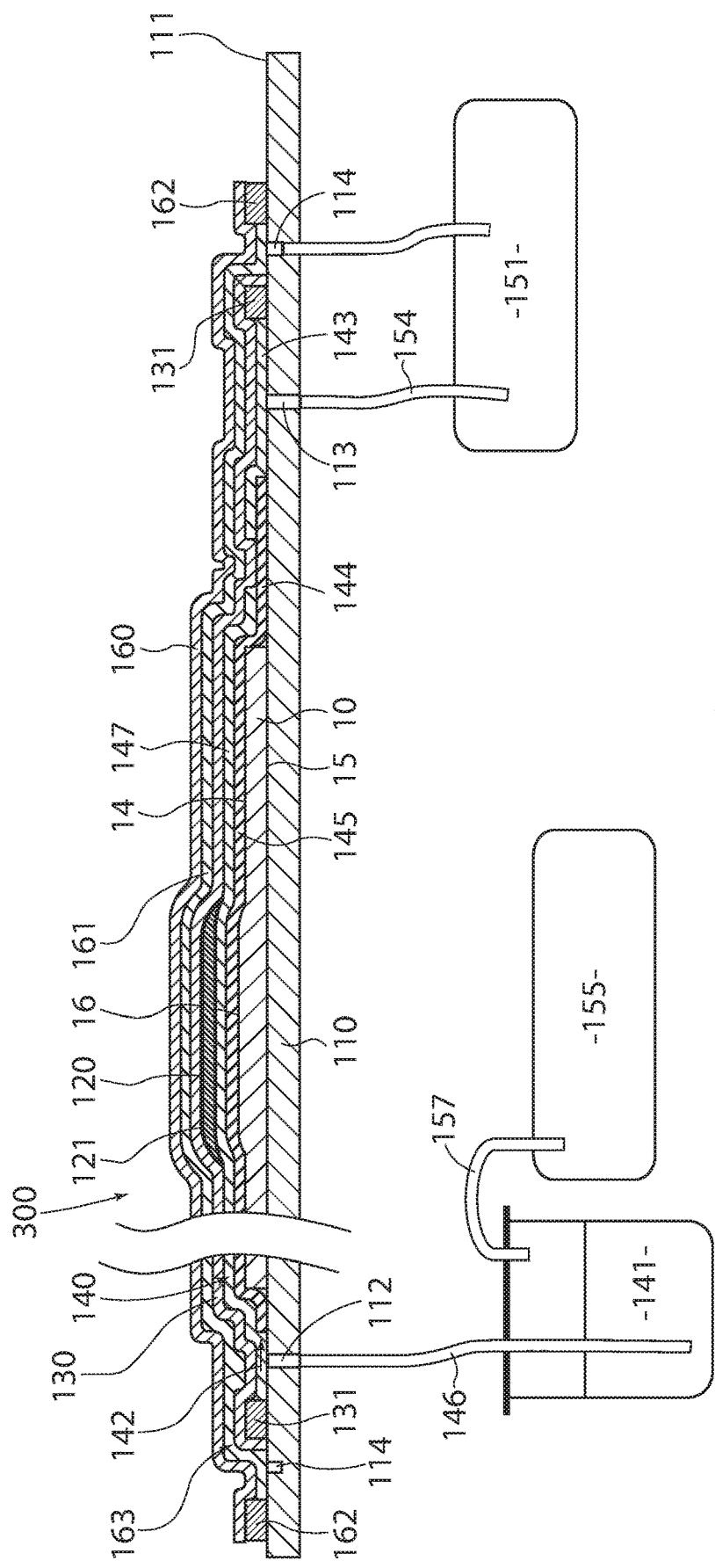
FIG. 6 is a schematic cross-sectional view of a system for fabricating a composite structure according to a third embodiment, taken at a cross-section equivalent to FIG. 3.

FIG. 6 depicts a schematic cross-sectional view of another double-bag configuration, forming a system 300 according to a third embodiment. The system 300 of the third embodiment is substantially identical to the system 200 of the second embodiment, apart from the location and arrangement of the thermoplastic patch 120. Accordingly, features of the system 200 of the second embodiment that are identical to features of the systems 100, 200 of the first and second embodiments are provided with identical reference numerals and will not be further discussed.

Rather than locating the thermoplastic patch 120 on the first vacuum bagging film 130, as is the case with the second embodiment, in the system 300 of the third embodiment, the thermoplastic patch 120 is located beneath the first vacuum bagging film 130, on top of the layer 147 of permeable flow media. Such an arrangement brings the thermoplastic patch 120 in slightly closer proximity to the upper surface 14 of the composite preform 10, slightly enhancing heat transfer between the composite preform 10 and thermoplastic patch 120. To avoid the possibility of the thermoplastic patch 120 from mixing and adhering to the composite preform 10 upon melting, the thermoplastic patch 120 may conveniently be housed within a pocket 121 of non-porous release film, such as Airtech A7250, available from Airtech International Inc. The thermoplastic patch 120 may alternatively be otherwise isolated from the composite preform 10 to avoid contact with melted thermoplastic material. The system 300 of the third embodiment is operated in the same manner as the system 200 of the second embodiment to form a composite structure.

It is also envisaged that the system 100 of the first embodiment may be modified to locate the thermoplastic patch 120 beneath the vacuum bagging film 130, preferably within a pocket of release film or similar, in a similar manner. The thermoplastic patch 120 could alternatively be located on the exterior of either the single-bag system 100 of the first embodiment, on the vacuum bagging film 130, or on the exterior of the double-bag system 200, 300 of either of the second or third embodiments, on the second vacuum bagging film 160. It is, however, preferred to locate the thermoplastic patch 120 in greater proximity to the surface of the composite preform 10 to enhance heat transfer between the composite preform 10 and the thermoplastic patch 120. It is still further envisaged that, in the various embodiments described, the thermoplastic patch 120 may be located in proximity to the lower surface 15 of the composite preform 10 rather than upper surface 14. The thermoplastic patch 120 could be located on the lower surface of the tool 110, particularly when a relatively thin tool is utilized. Alternatively, the thermoplastic patch 120 could be located between the tool surface 111 and the lower surface 15 of the composite preform 10, typically within a pocket of non-porous release film. Such a location may, however make an undesirable imprint on the lower surface 15 of the composite preform 10.

Figure 7:
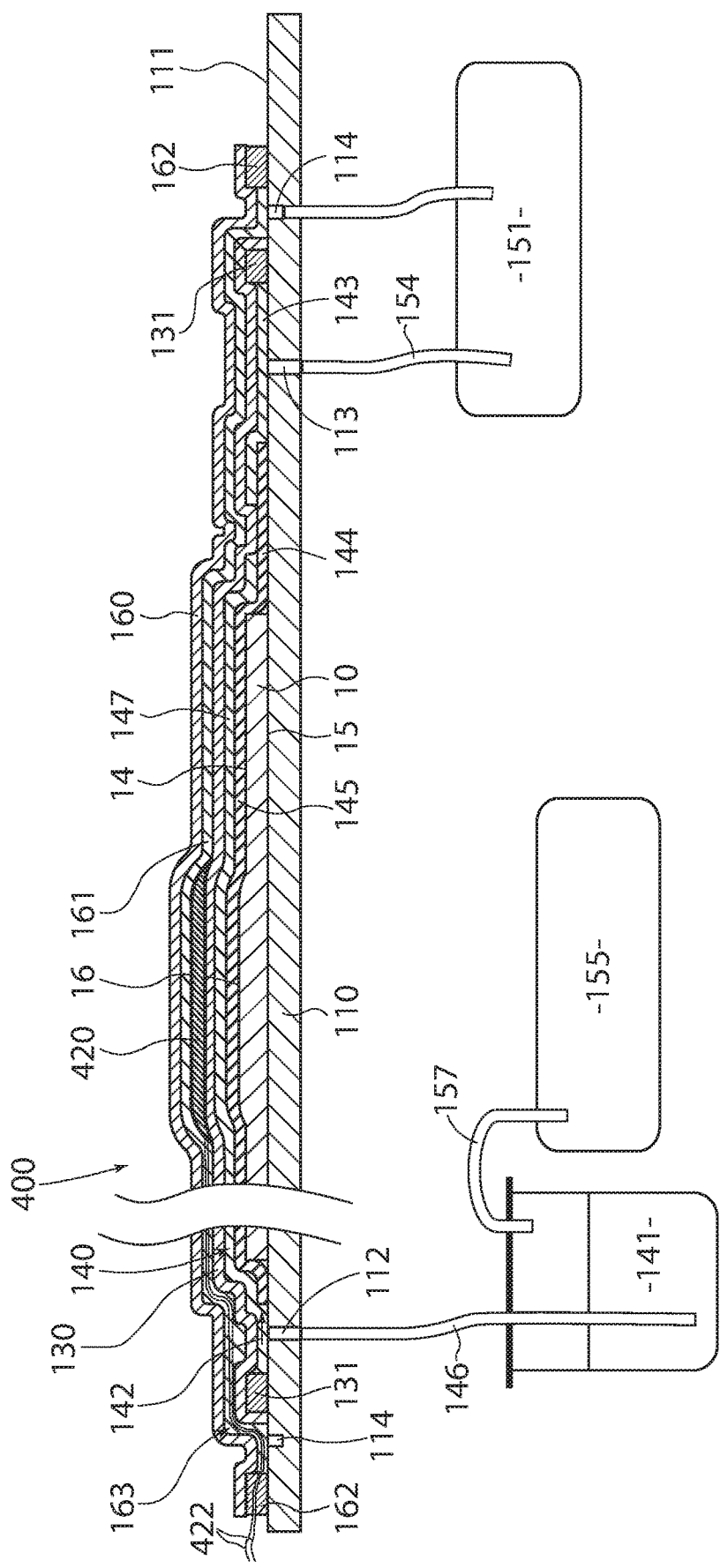
FIG. 7 is a schematic cross-sectional view of a system for fabricating a composite structure according to a fourth embodiment, taken at a cross-section equivalent to FIG. 3.

FIG. 7 depicts a schematic cross-sectional view of a further double-bag configuration that is identical to the configuration of the system 200 of the second embodiment, apart from the configuration of heat sink. Accordingly, features of the system 400 of the fourth embodiment that are identical to features of the systems of the first through third embodiments are provided with identical reference numerals and will not be further discussed.

In the system 400 of the fourth embodiment, rather than utilizing a passive heat sink, such as a thermoplastic patch, an active heat sink is utilized. In the depicted embodiment, the active heat sink is in the form of a thermoelectric cooling device 420. Thermoelectric cooling devices, otherwise commonly referred to as Peltier devices or Peltier heat pumps, generate a heat flux between two adjacent plates of differing materials upon application of a voltage cross the plates. Commonly available thermoelectric devices with maximum operating temperatures exceeding the exotherm peak temperature of the resin being utilized would be particularly suitable. Such a thermoelectric cooling device may be utilized with the cooling side of the thermoelectric device located in proximity to the upper surface 14 of the composite preform, thereby conducting heat away from the thickened portion 16 of the composite preform 10 during curing.

In the arrangement depicted in FIG. 7, the thermoelectric cooling device 420 is located on the first vacuum bag 130, within the second cavity 163 between the first and second vacuum bags 130, 160. A pair of wires 422, that are used to apply the voltage to the thermoelectric cooling device 420, may pass along the second cavity 163 and through to the exterior of the system 400 through the sealing tape 162 sealing the second vacuum bag 160 to the tool surface 111. Alternatively, the wires 422 could extend through an aperture formed in the second vacuum bag 160, with the aperture appropriately sealed.

The system 400 of the fourth embodiment is operated in the same manner as the system 200 of the second embodiment to form a composite structure except that, rather than conducting heat away from the portion 16 of the composite preform 10 passively with the thermoplastic patch 120, heat is conducted away actively by operating the thermoelectric cooling device 120 during the cure cycle.

Rather than locating the thermoelectric cooling device 420 on the first vacuum bagging film 130, the thermoelectric cooling device 420 could alternatively be located on the exterior of the system 400, on the second vacuum bagging film 160, although it is preferred to located the thermoelectric cooling device 420 in greater proximity to the localized region of the composite preform 10. It is also envisaged that the thermoelectric cooling device 420 could be located below the first vacuum bagging film 130, within a pocket of release film, in a similar manner to the arrangement of the thermoplastic patch 120 in the system 300 of the third embodiment, or in proximity to the lower surface 15 of the composite preform 15.

Rather than utilizing a thermoelectric cooling device, other forms of active heat sink are also envisaged. One such alternative may be a radiator and coolant arrangement, in which a series of tubes are arranged in proximity to the upper surface 14 of the composite preform 10 at the thickened portion 16 with coolant pumped through the tubes to conduct heat away from the portion 16.

Figure 8:
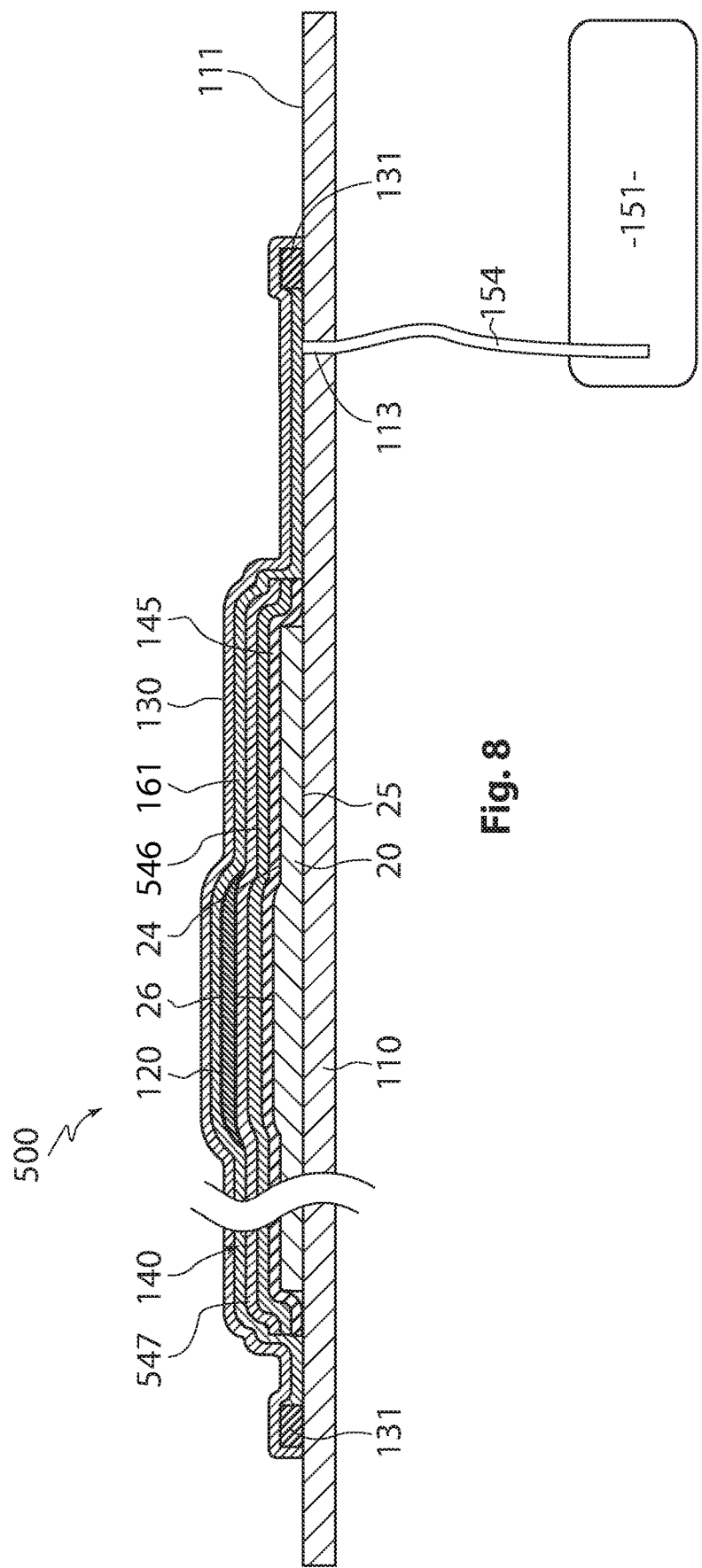
FIG. 8 is a schematic cross-sectional view of a system for fabricating a composite structure according to a fifth embodiment, taken at a cross-section equivalent to FIG. 3.

FIG. 8 depicts a schematic cross-sectional view of a system 500 for fabricating a composite structure according to a fifth embodiment. The system 500 involves fabricating a composite structure from prepreg composite material, rather than resin infusing a dry composite preform as part of the process, as is the case with the first through fourth embodiments. Features of the system 500 of the fifth embodiment that are identical or equivalent to features of the first through fourth embodiments described above are provided with like reference numerals.

The composite preform 20 comprises a plurality of plies of prepreg composite material. With resin being pre-impregnated in the prepreg composite material there is no need for a resin infusion process, as is the case with the first through fourth embodiments. The composite preform 20 has an upper surface 24 and an opposing lower surface 25. The upper and lower surfaces 24, 25 each define a preform major surface. A heat sink, which may be a passive heat sink formed of an endothermic material, such as a thermoplastic patch 120 as described above, or an active heat sink such as a thermoelectric cooling device, is located in proximity to one of the preform major surfaces, and particularly the upper surface 24 in the depicted embodiment. The thermoplastic patch 120 extends across only a portion 26 of the composite preform 20. As with the portion 16 of the first through fourth embodiments, the portion 26 may be a portion of the composite preform 20 that is susceptible to excessive exothermic heating during resin cure, such as a thicker portion of the composite preform 20 forming a padup. The system 500 further comprises a heat source, which may again be in the form of an oven (not depicted) for heating the composite preform 20 to cure the pre-impregnated resin within the composite preform 20.

As with the first through fourth embodiments, the composite preform 20 is located on the upper tool surface 111 of a tool 110 and a vacuum bagging film 130 is again sealed relative to the tool surface 111 to define a sealed first cavity 140 between the vacuum bagging film 130 and the tool surface 111, with the composite preform 20 located in the first cavity 140. Various layers of layup materials are located beneath the vacuum bagging film 130. Specifically, a permeable peel ply 145 is located directly on, and extends over, the entirety of the composite preform 20. A bleeder layer 546 is located on, and extends over, the permeable peel ply 145.

The bleeder layer 546 acts to absorb any excess resin bleeding from the composite preform 20 when compacted under atmospheric pressure, and also provides a path for the escape of volatiles during the curing procedure. A release film 547 is located on and extends over the bleeder layer 546 so as to retain excess resin within the bleeder layer 546 and prevent the same from sticking to the breather layer 161 that is located on, and extends over, the release film 547. The breather layer 161 extends beyond the composite preform 20, peel ply 145, bleeder layer 546 and release film 547 to beyond a vacuum outlet 113 which communicates with a first vacuum source 151 by way of a vacuum pipe 154. The vacuum bagging film 130 is sealed to the tool surface 111 by way of strips 131 of sealing tape, as with the first through fourth embodiments. In the arrangement depicted, the thermoplastic patch 120 is located on the release film 547, which is generally non-porous. The release film 547 will thus prevent the thermoplastic patch 120, when melted, from mixing with and sticking to the composite preform 20. It is also envisaged, however, that the thermoplastic patch 120 may be located beneath the release film 547, located within a pocket of release film, in a similar manner to the third embodiment, with the release film pocket acting to prevent the thermoplastic patch 120 from mixing with or sticking to the composite preform 20 upon melting. It is still further envisaged that the thermoplastic patch 120 might be located on top of the vacuum bagging film 130, or in proximity to the lower surface 25 of the composite preform 20.

In use, once the composite preform 20 and layup materials have been assembled as discussed above, at least partial vacuum pressure, typically full vacuum pressure (0 mBar/0 kPa absolute pressure) is applied to the first cavity 140 by the first vacuum source 151, thereby allowing atmospheric pressure (or greater via the aid of an autoclave) acting on the exterior of the vacuum bagging film 130 to act on the composite preform 20 and compact the same. The composite preform 20 may then be cured by gradually elevating the temperature of the oven or autoclave to a temperature suitable for curing of the resin. For typical epoxy resins, curing temperatures of the order of 1800 C to 2000 C will again be typical. Full vacuum is typically maintained on the first vacuum source 151 during the curing process, to ensure the resin infused composite preform 20 remains consolidated and to assist in curing of the resin. If the curing resin within the portion 26 of the composite preform 20 starts to exhibit exothermic behavior and locally overheat the portion 26, also heating the thermoplastic patch 120 to a temperature exceeding its melting temperature, the thermoplastic patch 120 will melt, thereby conducting heat away from the portion 26 of the composite preform 20, with the heat being absorbed through the endothermic reaction of the melting process. As a result, the oven may be heated to curing temperature more rapidly, and potentially to a higher curing temperature for quicker cure, than otherwise available without the use of the thermoplastic patch 120, in a similar manner to that described above in relation to the first through fourth embodiments. In place of the thermoplastic patch 120, the use of an active heat sink such as a thermoelectric cooling device as described above in relation to the fourth embodiment is also envisaged.

Figure 9:
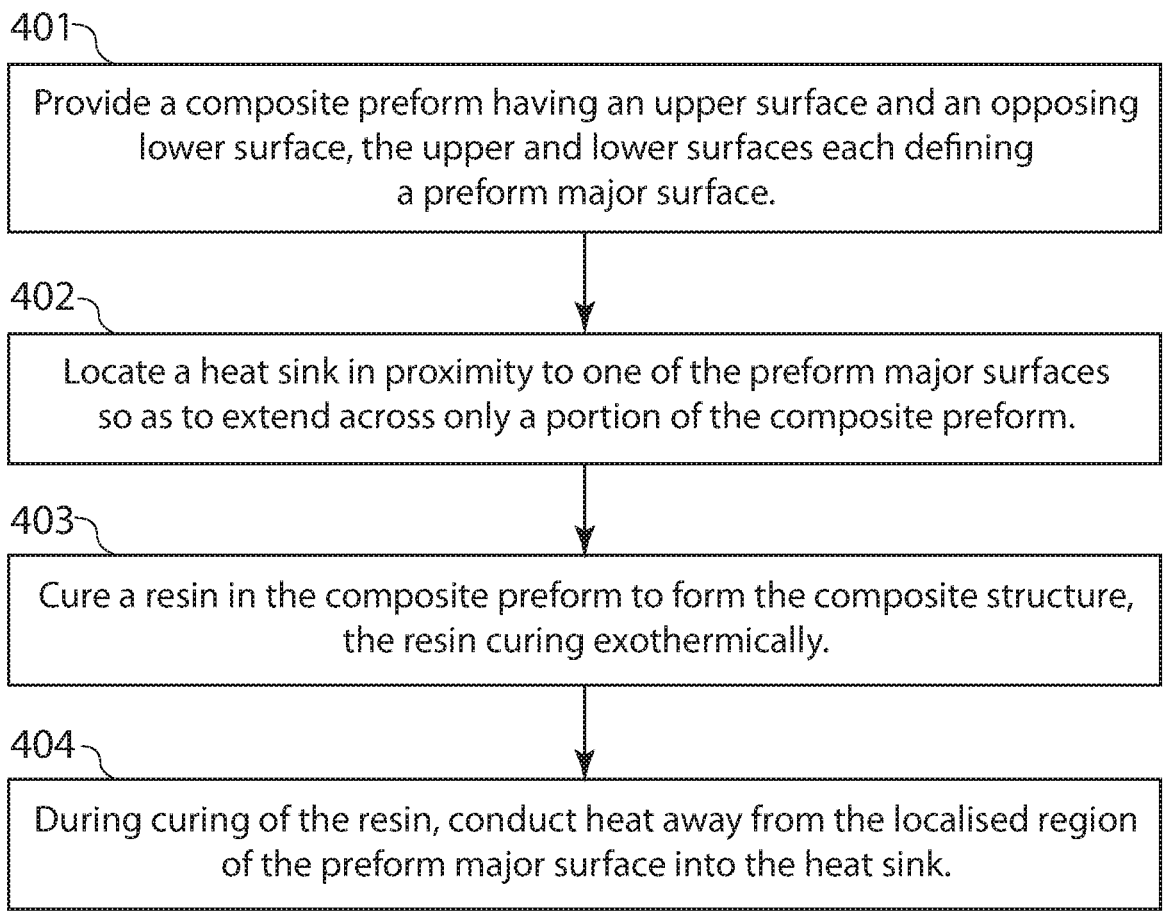
FIG. 9 is a flow chart of an exemplary method for fabricating a composite structure.

A general method of resin infusing the composite preform as discussed above is depicted in general terms in the flow diagram of FIG. 9. At block 401, a composite preform having an upper surface and an opposing lower surface is provided. The upper and lower surfaces each defining a preform major surface. A block 402, a heat sink is located in proximity to one of the preform major surfaces so as to extend across only a portion of the composite preform. At block 403, a resin is exothermically cured in the composite preform to form the composite structure. At block 404, during curing of the resin, heat is conducted away from the portion of the composite preform into the heat sink.

Persons skilled in the art will appreciate that the above specific embodiments described above are merely examples of the present disclosure. Persons skilled in the art will appreciate that the various features described in relation to different embodiments may be used in combination or as alternatives. Persons skilled in the art will also appreciate various other modifications and alternatives to the embodiments described.

The invention claimed is:

1. A method of fabricating a composite structure, said method comprising:
   providing a composite preform having an upper surface and an opposing lower surface, said upper and lower surfaces each defining a preform major surface, wherein the composite preform further comprises a first portion having a first thickness and a second portion having a second thickness thicker than the first thickness; and wherein the second portion of said composite preform has a higher volume of a resin per unit of preform surface area than the first portion;
   forming a cavity between a tool and a vacuum bagging film such that said composite preform is located with the cavity;
   locating a heat sink below the vacuum bagging film in proximity to one of said preform major surfaces so as to extend across and over only the second portion of said composite preform;
   curing said resin in said composite preform to form the composite structure by heating said composite preform to a curing temperature, said resin curing exothermically; and
   during curing of said resin, conducting heat away from only the second portion of said composite preform into said heat sink to prevent overheating of the second portion.

2. The method of claim 1, wherein locating said heat sink comprises locating a passive heat sink formed of an endothermic material.

3. The method of claim 2, wherein locating said passive heat sink comprises locating a thermoplastic patch, said method further comprising melting said patch during curing of said resin, said patch absorbing said heat during melting of said patch.

4. The method of claim 1, wherein locating said heat sink comprises locating an active heat sink.

5. The method of claim 4, wherein locating said active heat sink comprises locating a thermoelectric cooling device, said method further comprising operating said thermoelectric cooling device during curing of said resin to conduct heat away from the second portion.

6. The method of claim 1, wherein locating said heat sink below the vacuum bagging film comprises housing said heat sink within a pocket formed by a non-porous release film to prevent said heat sink from mixing and adhering to said composite preform during heating and further comprising:
   applying at least partial vacuum pressure to said cavity during curing of said resin.

7. The method of claim 6, wherein the vacuum bagging film is a first vacuum bagging film and further comprising:
   placing a second vacuum bagging film over said first vacuum bagging film and said heat sink.

8. The method of claim 1, wherein providing said composite preform comprises providing a composite preform with a non-uniform thickness measured between said upper and lower surfaces, the second portion of said composite preform having a thickness greater than an average thickness of said composite preform.

9. The method of claim 1, further comprising infusing said resin into said composite preform prior to curing said resin.

10. The method of claim 1, wherein providing said composite preform comprises providing a composite preform comprising a plurality of plies of prepreg composite material, said resin being pre-impregnated in said prepreg composite material.

11. A system for fabricating a composite structure, said system comprising:
    a composite preform having an upper surface and an opposing lower surface, said upper and lower surfaces each defining a preform major surface, wherein the composite preform further comprises a first portion having a first thickness and a second portion having a second thickness thicker than the first thickness;
    an exothermically curing resin to be infused into said composite preform, or pre-impregnated in said composite preform, the second portion of said composite preform having a higher volume of the resin per unit of preform surface area than the first portion;
    a tool, wherein said composite preform is located on a tool surface of the tool;
    a vacuum bagging film extending over said composite preform and sealed relative to said tool surface to define a cavity between the vacuum bagging film and said tool surface with said composite preform being located in the cavity;
    a heat sink located in proximity to one of said preform major surfaces below the vacuum bagging film so as to extend across and over only the second portion of said composite preform; and
    a heat source for heating said composite preform to a curing temperature to cure said resin, wherein said heat sink extending across and over only the second portion of said composite preform allows heat to be transferred into said heat sink from only the second portion to prevent overheating of the second portion during curing.

12. The system of claim 11, wherein said heat sink is a passive heat sink formed of an endothermic material.

13. The system of claim 12, wherein said passive heat sink comprises a thermoplastic patch, said patch having a melting temperature equal to or less than an exotherm peak temperature of said resin.

14. The system of claim 11, wherein said heat sink is an active heat sink.

15. The system of claim 14, wherein said active heat sink comprises a thermoelectric cooling device.

16. The system of claim 11, further comprising:
    a vacuum source communicating with the cavity; and
    a non-porous release film that forms a pocket for housing said heat sink to prevent said heat sink from mixing and adhering to said composite preform during heat.

17. The system of claim 16, wherein the vacuum bagging film is a first vacuum bagging film and further comprising:
    a second vacuum bagging film extending over said first vacuum bagging film and said heat sink and sealed relative to said tool surface.

18. The system of claim 11, wherein said composite preform has a non-uniform thickness measured between said upper and lower surfaces, the second portion of said composite preform having a thickness greater than an average thickness of said composite preform.

19. The system of claim 11, wherein said heat sink prevents overheating of the second portion of said composite preform until said resin throughout said composite preform is fully cured.

20. The system of claim 11, wherein said composite preform comprises a plurality of plies of prepreg composite material pre-impregnated with said resin.

\* \* \* \* \*